(12) United States Patent
Bachrach

(10) Patent No.: US 6,782,001 B1
(45) Date of Patent: Aug. 24, 2004

(54) PHYSICAL LAYER AND DATA LINK INTERFACE WITH RESET/SYNC SHARING

(75) Inventor: Yuval Bachrach, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/471,653

(22) Filed: Dec. 23, 1999

(51) Int. Cl.⁷ .......................... H04J 3/06; H04L 12/66
(52) U.S. Cl. ........................ 370/463; 370/503
(58) Field of Search ............... 370/241, 247, 370/248, 252, 463, 354, 503; 709/227, 228, 250

(56) References Cited

U.S. PATENT DOCUMENTS

| | | |
|---|---|---|
| 4,525,795 A | 7/1985 | Rubin |
| 5,088,090 A | 2/1992 | Yacoby |
| 5,214,646 A | 5/1993 | Yacoby |
| 5,305,317 A | 4/1994 | Szczepanek |
| 5,371,734 A | 12/1994 | Fischer |
| 5,455,700 A | 10/1995 | Thompson et al. |
| 5,493,571 A | 2/1996 | Engdahl et al. |
| 5,513,320 A | 4/1996 | Young et al. |
| 5,592,468 A | 1/1997 | Sato |

(List continued on next page.)

FOREIGN PATENT DOCUMENTS

WO   WO 98/11696   3/1998

OTHER PUBLICATIONS

Lettierei, Paul et al. Adaptive Frame Length Control for Improving Wireless Link Throughput, Range, and Energy Efficiency.

ANSI/IEEE STD. 802.3 Carrier Sense Multiple Access with Collision Detection (CSMA/CD) Access Method and Physical Layer Specifications, 1085, The Institute of Electrical and Electronics Engineers Inc., 5th printing, pp. 20–56.

Matthew Flint et al. Inside TCP/IP, Second Edition, 11 pages.

Primary Examiner—Alpus H. Hsu
Assistant Examiner—Toan Nguyen
(74) Attorney, Agent, or Firm—Seth Z. Kalson (57) ABSTRACT

A word-based interface between a MAC and a PHY, allowing for variable pin counts, variable PHY and MAC data speeds, and variable numbers of connected PHYs. The word-based interface allows for the PHY to provide PHY-to-MAC words to the MAC, and for the MAC to provided MAC-to-PHY words to the PHY, where the PHY-to-MAC words are synchronized with the MAC-to-PHY words. Data and commands are provided in fields of the words, and may be time multiplexed over the interface. Circuits within the MAC and PHY allow for the MAC to detect if a PHY is present, the number of active pins, and the number of PHYs connected. The reset and synchronization signals are integrated into a single reset/sync signal. Identification data is exchanged between the MAC and PHY so that the proper device driver for the PHY may be loaded independently of the BIOS.

16 Claims, 12 Drawing Sheets

U.S. PATENT DOCUMENTS

| | | | |
|---|---|---|---|
| 5,619,652 A | 4/1997 | Travaglio | |
| 5,635,856 A | 6/1997 | Raza et al. | |
| 5,636,140 A | 6/1997 | Lee et al. | |
| 5,708,779 A | 1/1998 | Graziano et al. | |
| 5,926,504 A | 7/1999 | Andersson et al. | |
| 5,938,728 A | 8/1999 | Dwork et al. | |
| 5,963,543 A | 10/1999 | Rostokel et al. | |
| 6,044,087 A | 3/2000 | Muller et al. | |
| 6,049,837 A | 4/2000 | Youngman | |
| 6,058,427 A | 5/2000 | Viswanath et al. | |
| 6,085,248 A | 7/2000 | Sambamurthy et al. | |
| 6,098,103 A | 8/2000 | Dreyer et al. | |
| 6,108,726 A | 8/2000 | Runaldue et al. | |
| 6,141,352 A | 10/2000 | Gandy | |
| 6,157,951 A | 12/2000 | Vasa | |
| 6,222,852 B1 | 4/2001 | Gandy | |
| 6,226,680 B1 | 5/2001 | Boucher et al. | |
| 6,260,162 B1 | 7/2001 | Typaldos et al. | |
| 6,269,104 B1 | 7/2001 | McLaughlin et al. | |
| 6,292,467 B1 * | 9/2001 | Keller | 370/241 |
| 6,295,281 B1 | 9/2001 | Itkowsky | |
| 6,314,501 B1 | 11/2001 | Gullick et al. | |
| 6,328,480 B1 * | 12/2001 | Strike | 385/75 |
| 6,345,310 B1 * | 2/2002 | Allison et al. | 709/250 |
| 6,363,432 B1 | 3/2002 | Laber | |
| 6,377,640 B2 | 4/2002 | Trans | |
| 6,385,208 B1 | 5/2002 | Findlater et al. | |
| 6,385,738 B1 * | 5/2002 | Lo | 714/25 |
| 6,427,173 B1 | 7/2002 | Boucher et al. | |
| 6,516,352 B1 * | 2/2003 | Booth et al. | 709/250 |
| 6,536,011 B1 * | 3/2003 | Jang et al. | 714/814 |

* cited by examiner

FIG. 1

| | | | |
|---|---|---|---|
| 0 | Rx_Er | I_Er | Int_rqst |
| 1 | Rx_Er | Seed | Link |
| 2 | Rx_Er | Duplex | rsrvd |
| 3 | CRS | CRS | CRS |
| 4 | Even | SQL | rsrvd |
| 5 | PtM_mode | RST_RQST | rsrvd |
| 6 | 00 | 01 | 10 |
| 7 | 00 | 01 | 10 |
| 8 | Mdout | Mdout | Mdout |
| 9 | Tx_Cyc | Tx_Cyc | Tx_Cyc |
| 10 | Rx_Cyc | Rx_Cyc | Rx_Cyc |
| 11 | Rx_DV = 0 | Rx_DV = 0 | Rx_DV = 0 |
| | Word 0 | Word 1 | Word 2 |

FIG. 2

| | |
|---|---|
| 0 | Rdata7 |
| 1 | Rdata6 |
| 2 | Rdata5 |
| 3 | CRS |
| 4 | Rdata4 |
| 5 | Rdata3 |
| 6 | Rdata2 |
| 7 | Rdata1 |
| 8 | Rdata0 |
| 9 | Tx_Cyc |
| 10 | Rx_Cyc = 1 |
| 11 | Rx_Dv = 1 |

FIG. 3

| | |
|---|---|
| 0 | Rdata7 |
| 1 | Rdata6 |
| 2 | Rdata5 |
| 3 | CRS |
| 4 | Rdata4 |
| 5 | Rdata3 |
| 6 | Rdata2 |
| 7 | Rdata1 |
| 8 | Rdata0 |
| 9 | Mdout |
| 10 | Rx_Cyc = 1 |
| 11 | Rx_Dv = 1 |

FIG. 4

| 0 | rsrvd |
|---|---|
| 1 | rsrvd |
| 2 | rsrvd |
| 3 | CRS |
| 4 | rsrvd |
| 5 | rsrvd |
| 6 | rsrvd |
| 7 | rsrvd |
| 8 | Mdout |
| 9 | Tx_Cyc |
| 10 | Rx_Cyc = 0 |
| 11 | Rx_Dv = 1 |

FIG. 5

| | | | Command_Word | |
|---|---|---|---|---|
| 0 | Tdata7 | Rx_addr_match | | |
| 1 | Tdata6 | LED_SEL | | |
| 2 | Tdata5 | Lpbk | | |
| 3 | Tdata4 | PHY_PD | | |
| 4 | Tdata3 | rsrvd | | |
| 5 | Tdata2 | rsrvd | | |
| 6 | Tdata1 | rsrvd | | |
| 7 | Tdata0 | rsrvd | | |
| 8 | Tx_EN = 1 | Tx_EN = 0 | | |
| 9 | Mdin | | | |
| 10 | Mdstart | | | |
| 11 | SEL = 0 | SEL = 1 | | |

FIG. 6

| Mdin | IDLE | ST | OP | Reg Addr (10 bits) | Data (16 bits) |
|---|---|---|---|---|---|
| | 000....0 | 1 | 01 | | |
| Mdout | | | IDLE | | |

FIG. 7

| Mdin | IDLE | ST | OP | Reg Addr (10 bits) | Wait Time | IDLE |
|---|---|---|---|---|---|---|
| | 000...0 | 1 | 10 | | 0001 | 000....0 |
| Mdout | | | IDLE | | 0001 | Data (16 bits) |

PHYSICAL LAYER AND DATA LINK INTERFACE WITH RESET/SYNC SHARING

BACKGROUND

In a system of networked computers, a computer communicates with other computers in the network via a data link or medium. The interface between the medium and the computer is often referred to as a network controller. The network controller interprets data from the computer and modulates an electromagnetic wave that is propagated on the medium in response to the data, and also receives and demodulates electromagnetic waves propagating on the medium in order to provide received data to the computer.

Within the context of the OSI (Open Systems Interconnection) layered communication model of the ISO (International Standards Organization), a network controller provides the function of a DLC (Data Link Control) and a PHY (Physical layer). A standard for a popular network and medium is defined in IEEE (Institute of Electrical and Electronic Engineers) standard 802.3, commonly referred to as Ethernet. Ethernet further divides the DLC so that it includes a MAC (Medium Access Control) sublayer.

In the past, a network controller usually comprised a set of semiconductor components residing on a card. However, with the number of transistors on a die increasing, the level of integration is also increasing. As a result, the MAC usually associated with a network controller may be integrated with the chipset of a personal computer. With such an arrangement, the PHY may be supplied separately by manufacturers other than the manufacturer of the chipset. Consequently, it is desirable that the interface between a MAC and PHY be flexible enough so that PHYs from different manufacturers, with possibly different numbers of pin counts and data link speeds, may be connected to the MAC. It is also desirable that the pin count for such an interface be kept as small as possible without sacrificing flexibility and future requirements.

DESCRIPTION OF EMBODIMENTS

Figure 1:
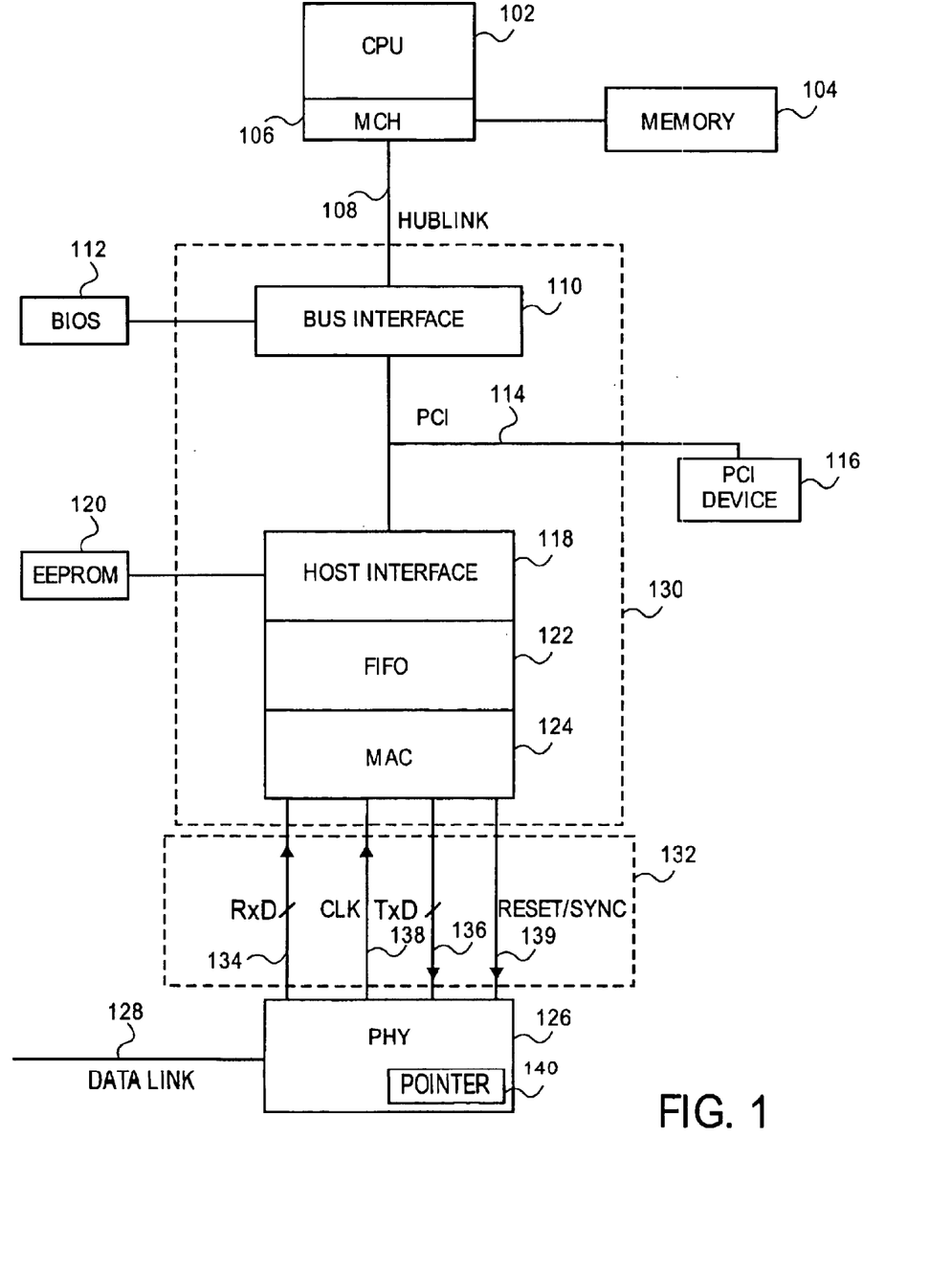
FIG. 1 illustrates a computer system employing an embodiment of the present invention.

A computer system utilizing embodiments of the present invention is shown in FIG. 1. The computer system of FIG. 1 comprises CPU (Central Processing Unit) 102, but a multi-processor system utilizing embodiments of the present invention may also be realized. Various architectures may be employed for CPU 102 to communicate with system memory 104 and other components of the computer system. In the embodiment of FIG. 1, MCH (Memory Controller Hub) 106 is integrated within CPU 102 and serves as a memory controller for system memory 104 and an interface to hublink 108. Hublink 108 provides for communication between CPU 102 and other components, and it may be part of a larger I/O system and switch. A bus may be employed instead of hublink 108.

Bus interface 110 provides an interface between hublink 108, BIOS (Basic Input Output System) memory 112, and bus 114. BIOS memory 112 may be non-volatile memory, such as an EEPROM (Electrically Erasable Programmable Read Only Memory). Bus 114 may be, for example, a PCI (Peripheral Component Interconnect) bus. See PCI Special Interest Group, www.pcisig.com. Various PCI devices, such as PCI device 116, may be connected to bus 114.

Connected to bus 114 is host interface 118 to provide an interface to FIFO (First-In-First-Out) buffer, which is connected to MAC unit 124. MAC 124 provides a medium access control function for communication across data link (medium) 128, and may, for example, implement the Ethernet protocol. Host interface 118 may also access nonvolatile memory, such as EEPROM 120.

PHY unit 126 performs modulation and coding of the digital signals provided by MAC 124, thereby providing an electromagnetic signal to be propagated along data link 128. PHY 126 also performs demodulation and decoding of received signals on data link 128. Data link 128 may be a bus, or a point-to-point link.

For one embodiment, components 110, 118, 122, and 124 comprise chipset 130, and PHY 126 is a distinct device from chipset 130. MAC 124 and PHY 126 communicate with each other through interface 132. Embodiments of the present invention provide for a cost-effective, flexible interface between MAC 124 and PHY 126.

Communication of data across interface 132 is word based. PHY 126 transmits a word to MAC 124 via wires RxD 134 and MAC 124 transmits a word to PHY 126 via wires TxD 136. Words that are transmitted from PHY 126 to MAC 124 are referred to as PtM (PHY-to-MAC) words, and words that are transmitted from MAC 124 to PHY 126 are referred to as MtP (MAC-to-PRY) words. The PtM and MtP words are synchronized with each other and with a clock signal propagating on wire CLK 138. Interface 132 also comprises Reset/Sync 139.

For one embodiment, the word lengths of the MtP and PtM words are equal to each other, and the number of wires making up RxD 134 and TxD 136 are equal to each other and is a divisor of the word length of the PtM and MtP words. If the number of wires making up RxD 134 and TxD 136 are less than the word lengths of the PtM and MtP words, then the fields making up the PtM and MtP words are time multiplexed over the respective RxD 134 and TxD 136 pins.

Figure 4:
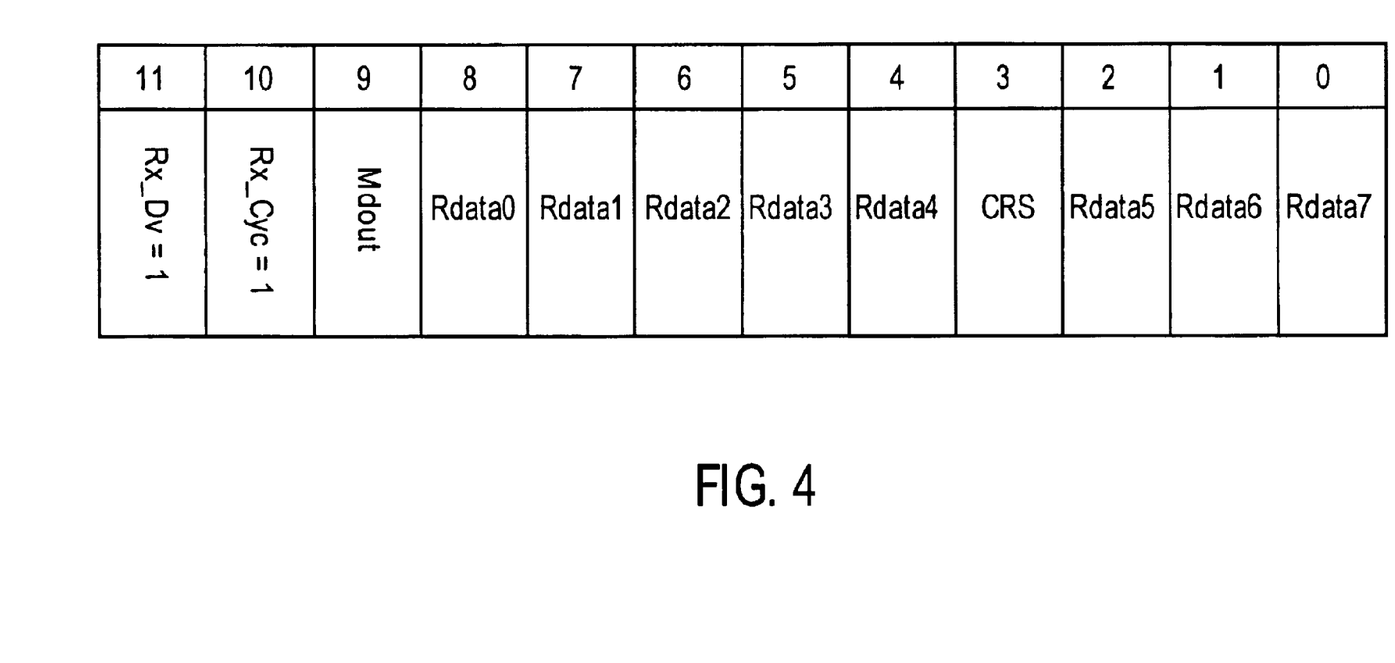
FIG. 4 illustrates the format of an equal speed mode PHY-to-MAC data word according to an embodiment of the present invention.
Figure 5:
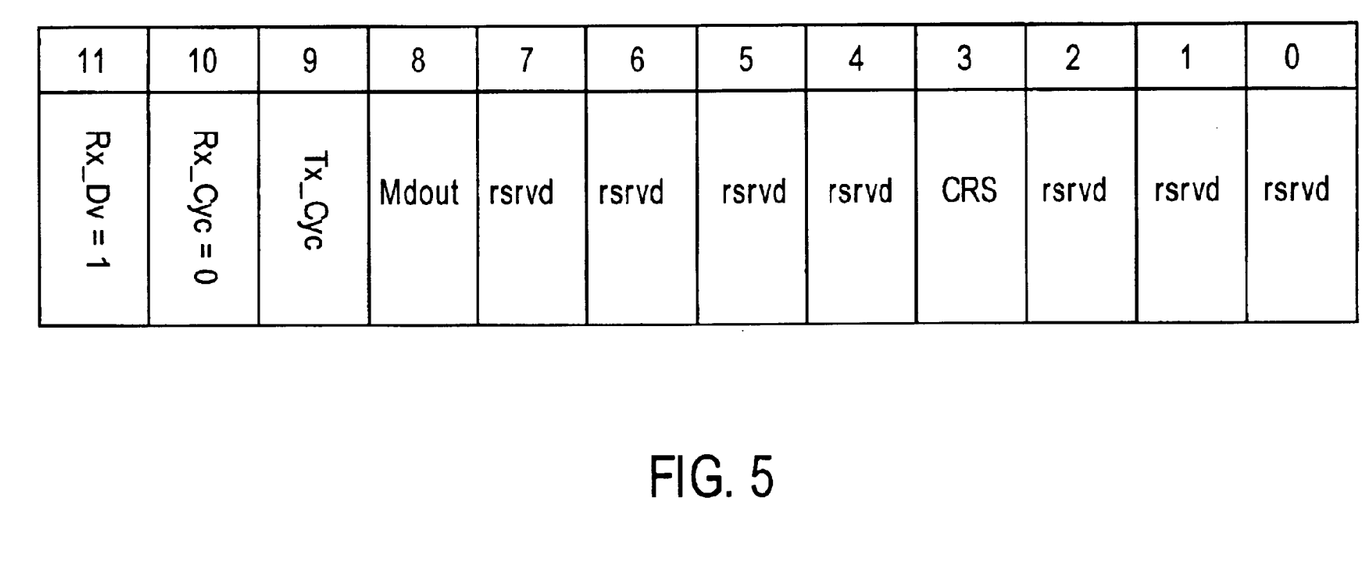
FIG. 5 illustrates the format of a PHY-to-MAC word having no receive data according to an embodiment of the present invention.
Figure 6:
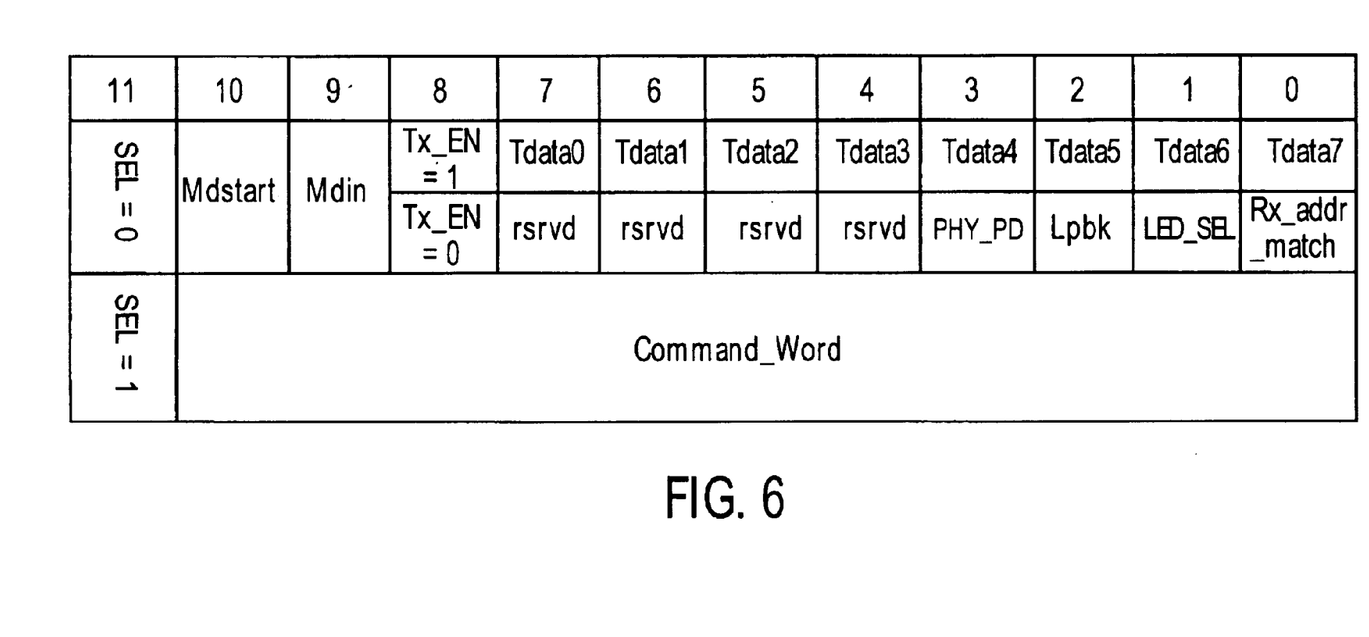
FIG. 6 illustrates the format of a MAC-to-PHY word according to an embodiment of the present invention.

For one embodiment, the formats for PtM words are provided in FIGS. 2, 3, 4, and 5, and the formats for MtP words are provided in FIG. 6. The most significant bit (field) position of PtM words (bit position number 11) is the Rx_DV (Receive Data Valid) field. Rx_DV indicates whether there is a valid data frame being transmitted by PHY 126 to MAC 124. For the particular embodiment of FIG. 2, Rx_DV=0 indicates that there is not a data frame in progress. If Rx_DV=0, then the PtM words provide control information between PHY 126 and MAC 124. In the particular embodiment of FIG. 2, this control information is provided by the three control words indicated as words 0, 1, and 2 in FIG. 2.

Figure 2:
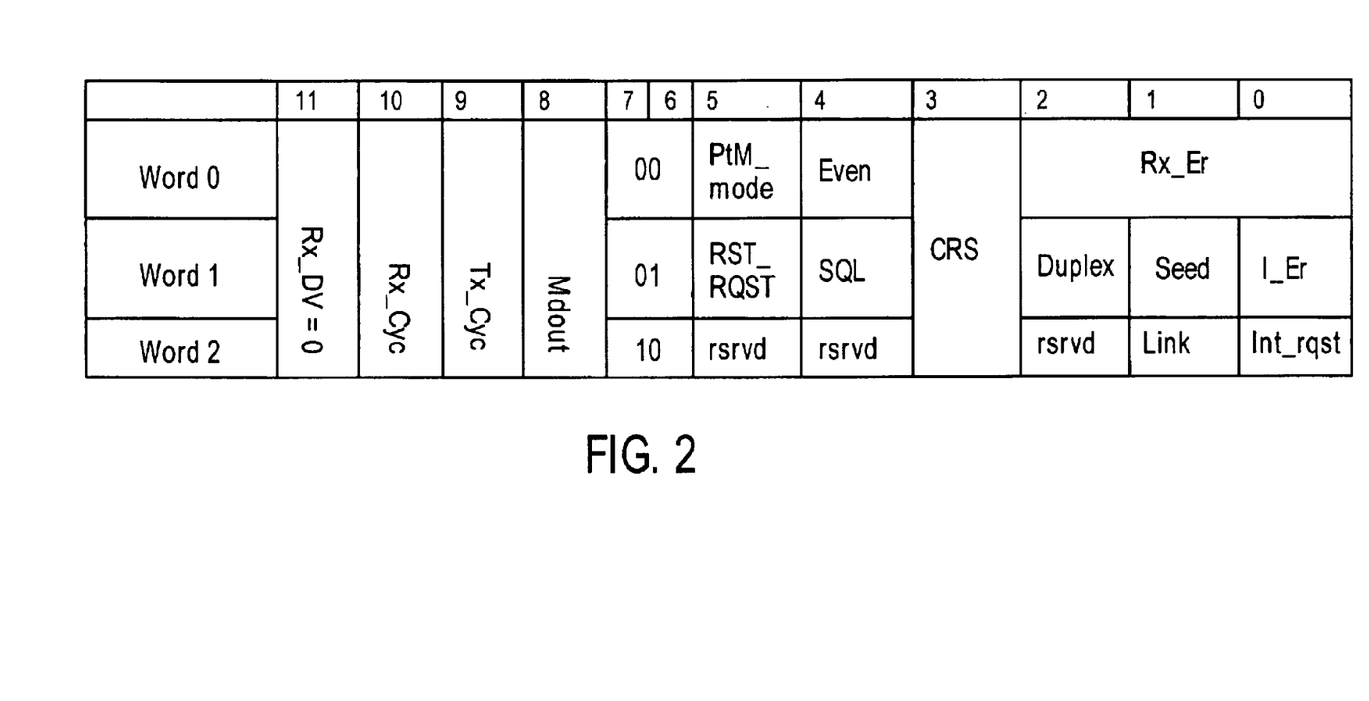
FIG. 2 illustrates the format of PHY-to-MAC control words according to an embodiment of the present invention.

Bit position number 9 in FIG. 2 is the Tx_Cyc (Transmit Cycle) field to indicate whether MAC 124 is requested by PHY 126 to send data in the next MtP word. For the particular embodiment of FIG. 2, Tx_Cyc=1 indicates that PHY 126 is ready for data from MAC 124, whereas Tx_Cyc=0 indicates that PHY 126 is not ready for data from MAC 124. In this way, various data link speeds may be supported without changing the clock signal frequency on CLK 138. Also, the transmit and receive speeds may be different. Furthermore, even when there is no frame in progress, the Tx_Cyc field may be used by PHY 126 to communicate to MAC 124 the data link speed.

Bit position number 8 in FIG. 2 is the Mdout (Management Frames Protocol Data Out) field. Mdout provides a data bit that MAC 124 reads from a register in PHY 126. To read multiple data bits from a register in PHY 126, multiple PtM words are used, each PtM word providing a single data bit. The Mdout field is described in more detail later in connection with a Management Frames Protocol and the Mdstart and Mdin fields of FIG. 6.

Bit positions 7 and 6 indicate which PtM format is used. In the embodiment of FIG. 2, "00", "01", and "10" in bits positions 7 and 6 indicate, respectively, words 0, 1, and 2.

Figure 3:
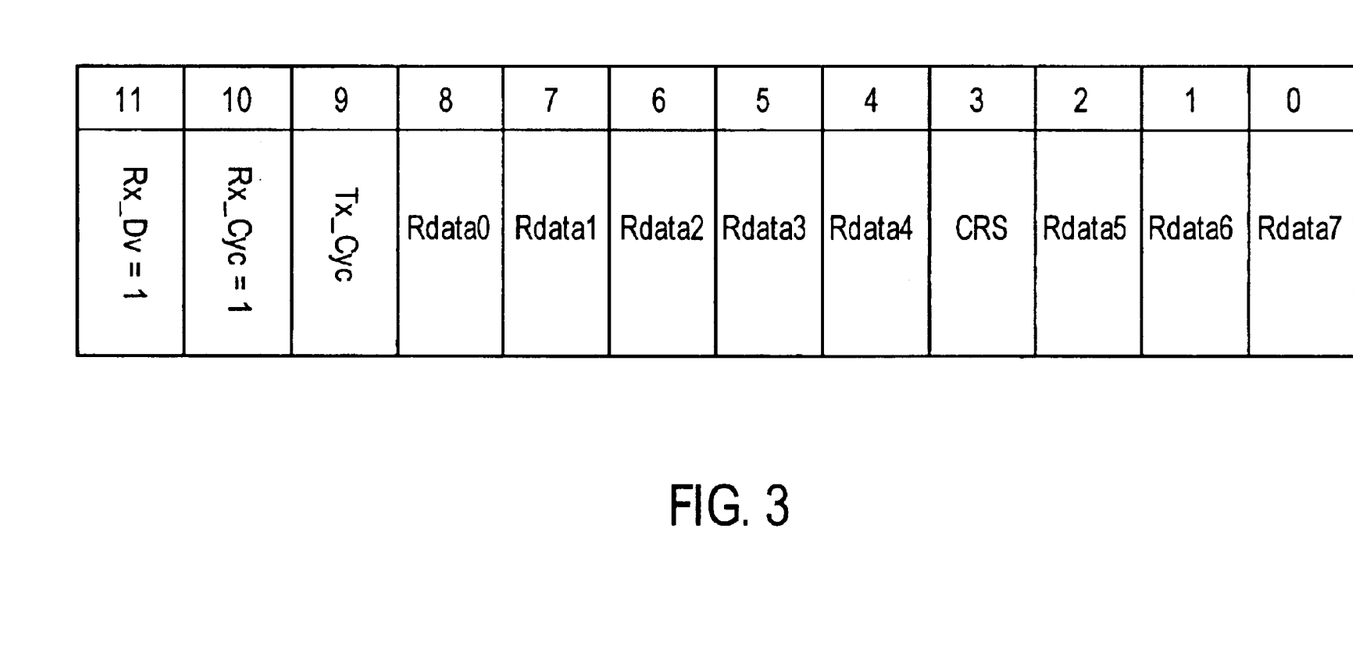
FIG. 3 illustrates the format of a slow speed mode PHY-to-MAC data word according to an embodiment of the present invention.

For the word 0 format, bit position number 5 is the PtM_mode (PHY to MAC Mode) field. The PtM_mode indicates the mode of the PtM data word that is used to transmit received data from PHY 126 to MAC 124. In the particular embodiment of FIGS. 3 and 4, a Slow mode PtM data word is shown in FIG. 3 and an Equal Speed mode PtM data word is shown in FIG. 4. MtP data words are indicated if Rx_DV=1 and Rx_Cyc (Receive Cycle)=1, as seen in FIG. 3 and 4.

The Equal Speed mode is used if the interface speed and MtP word formats are such that MAC 124 is able to transfer data to PHY 126 at the same data rate as PHY 126 is able to transmit on the medium. In the Equal Speed mode, the PtM data word shown in FIG. 4 does not have a Tx_Cyc field because PHY 126 is able to receive a data word from MAC 124 at the same rate that MAC 124 can provide data words. For the Slow mode, the data rate at which PHY 126 can transmit on the medium is less than the rate at which MAC 124 can generate data. Consequently the Tx_Cyc field (bit position 9 in FIG. 3) is used in the Slow mode PtM data word because PHY 126 is not always ready to receive 1data from MAC 124.

Bit position number 4 in word 0 of FIG. 2 is the Even field. For each frame of data received, only those frames with 8 bits of valid data are to be used. It may happen that for some received frames, there are less than 8 bits of data. For these frames, the Even field is set.

For word 1 in FIG. 2, bit position number 5 is the RST_RQST (Reset Request) field. This field indicates whether PHY 126 requests that MAC 124 send a reset signal to PHY 126. Bit position number 4 in word 1 is the SQL (Squelch) field. The SQL field indicates whether another device is connected to the medium to which PHY 126 is connected to, and may be used for power management. For word 2 in FIG. 2, the present embodiment does not specify the fields for bit positions 5 and 4, which are reserved for future developments.

Bit position number 3 for the PtM words in FIG. 2 is the CRS (Carrier sense Signal) field, which indicates whether a carrier signal on the medium is sensed by PHY 126.

Bit position numbers 2, 1, and 0 for word 0 of FIG. 2 constitute the Rx_Er (Received Error) field, which serves as an error detection flag for the previously received frame. Rx_Er=000 indicates that no error has been detected in a frame.

For word 1 of FIG. 2, bit position number 2 is the Duplex field, which indicates whether PHY 126 provides full-duplex or half-duplex communication. Bit position number 1 is the Speed field. PHY 126 may support two different speeds, e.g., 10 Mbit/sec and 100 Mbit/sec, or 10 Mbit/sec and 1 Mbit/sec. MAC 124 does not need to be aware of the speed of operation, but it needs to be able to report fast or slow speeds. The Speed field is used by MAC when generating such status information. Bit position number 0 is the I_Er (Interface Error) field, which indicates whether there is an error in interface 132.

For word 2 of FIG. 2, bit position 2 is not specified and is reserved for future developments. Bit position number 1 is the Link field, which indicates whether the data link is alive. Bit position number 0 is the Int-Rqst (interrupt Request) field, which allows PHY 126 to request that MAC 124 generate a software interrupt.

If both Rx_Dv=1 and Rx_Cyc=1, then a PtM word has either the Slow mode format of FIG. 3 or the Equal Speed format of FIG. 4. As described earlier, an Equal Speed format PtM word does not require the Tx_Cyc field. Bit position number 9 of an Equal Speed format word is the Mdout field, whereas bit position number 9 of the Slow mode format word is the Tx_Cyc field. Consequently, an Equal Speed format PtM data word may also provide register reads of PHY 126. Bit positions 0 through 8 of Slow and Equal Speed mode PtM words provide 8 bits of received data as well as the CRS field, as shown in FIGS. 3 and 4.

For the PtM word format illustrated in FIG. 5, Rx_Dv=1 and Rx_Cyc=0. In this case, the word may have data from register reads in the Mdout field in bit position 8, but in the particular embodiment illustrated there are no received data bits to read. Bit position number 9 is the Tx_Cyc field. The format of FIG. 5 applies to either the Slow mode or Equal Speed mode. Bit positions 4 through 7 and 0 through 2 are reserved, and bit position number 3 provides the CRS field.

FIG. 6 illustrates formats for MtP words according to an embodiment. The most significant bit of a MtP word is the SEL field. The particular format for SEL=1 is not specified in the present embodiment, and the MtP word in this case may provide for various commands as indicated in FIG. 6. For SEL=0, the rest of the bit positions are indicated as shown in FIG. 6, and are described below in connection with the earlier mentioned Management Frames Protocol.

Figure 7:
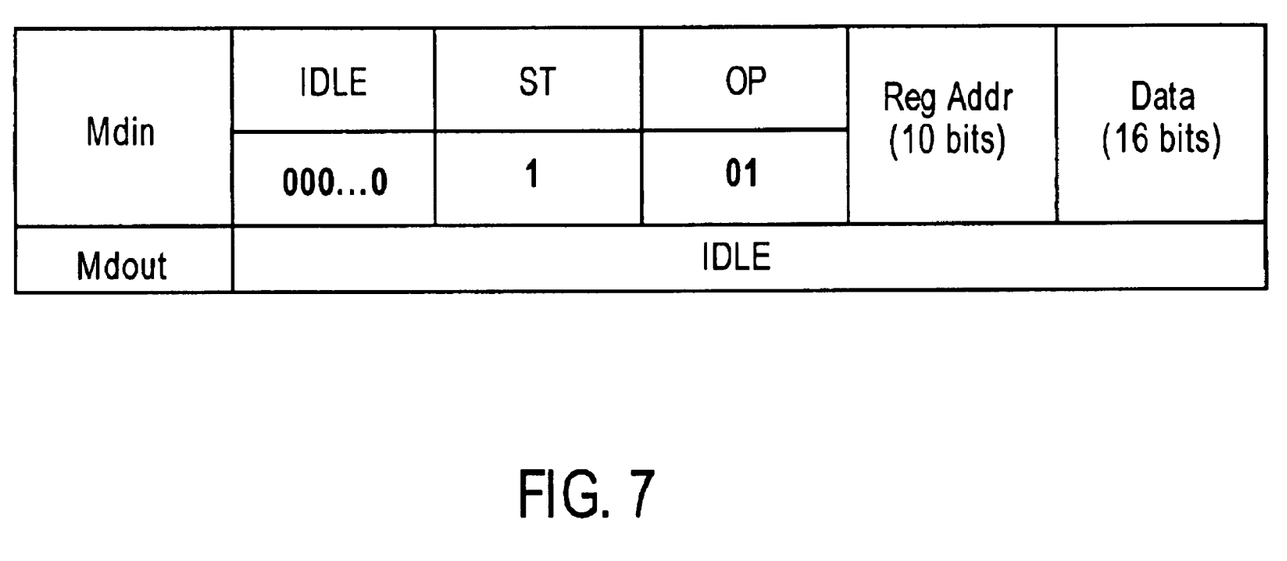
FIG. 7 illustrates the value of two word fields for a register write according to an embodiment of the present invention.
Figure 8:
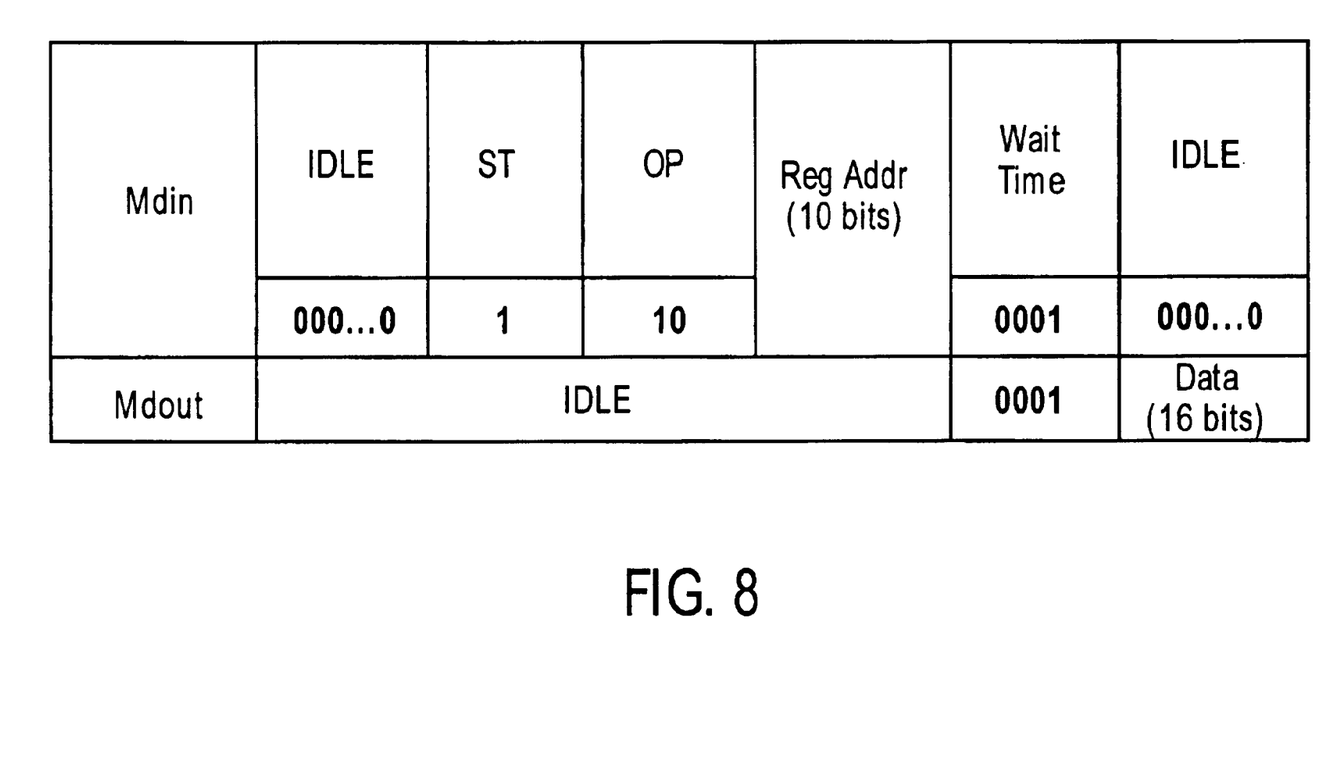
FIG. 8 illustrates the value of two word fields for a register read according to an embodiment of the present invention.

Bit position number 10 is the Mdstart (Management Frames Protocol Frame Start) field and bit position number 9 is the Mdin (Management Frames Protocol Frame In) field. The Mdstart field indicates to PHY 126 that MAC 124 is to perform a register read or write to PHY 126. In the particular embodiment of FIG. 6, Mdstart=1 indicates that MAC 124 is to perform a register read or write. The Mdin field indicates whether the register operation is a read or write. The values for the Mdin field for a register write are indicated in FIG. 7, and the values for the Mdin field for a register read are indicated in FIG. 8. As seen in FIG. 7, the Mdin field also provides the register address and data. FIGS. 7 and 8 also indicate the values of the Mdout field for register reads and writes. The time direction for FIGS. 7 and 8 is from left to right.

For a register write, Mdout is held IDLE. For one embodiment, IDLE is either at 0 or 1, that is, the corresponding pin is not tri-stated when in the IDLE mode. Mdin is held IDLE for some period of time until Mdstart=1. For the particular embodiment of FIG. 7, Mdin has the value 0 when held IDLE. When Mdstart=1, Mdin is set to some value ST (Start), which for the embodiment of FIG. 7 is indicated as a value of 1. The next two bit values for Mdin are denoted by OP, which is the particular operation to be performed. For the embodiment of FIG. 7, OP=01 indicates that a register write is to be performed. The next 10 bit values for Mdin constitute the address of the register to be read, and the next 16 bit values of Mdin constitute the data to be written.

As seen in the embodiment of FIG. 8, for a register read OP=10. After the 10 bits of the address of the register to be read are provided by Mdin, there is a wait time in which Mdin takes on the four bit values 0001. This wait time gives PHY 126 time to prepare the data to be read. Mdout is held at IDLE, followed by a wait time, and then followed by the 16 bit data value to be read.

It is seen that the word formats in FIGS. 2 through 6, and the bit values for Mdin and Mdout as shown in FIGS. 7 and 8, provide a mechanism for a nested serial interface between PHY 126 and MAC 124, so that register reads and writes may be accomplished with only one pin. Such register transactions us multiple transmissions of words across interface 132.

Returning to FIG. 6, bit position number 8 is the Tx_EN (Transmit Enable) field. For Tx_EN=1, the next 8 bits of the MtP word is the data octet provided by MAC 124 to PHY 126 for transmission over the data link. For Tx_EN=0, bit position numbers 4, 5, 6, and 7 are reserved, bit position 3 is the PHY_PD (PHY Power Down) field, bit position number 2 is the Lpbk (Loop Back) field, bit position number 1 is the LED_SEL (Light Emitting Diode Select) field, and bit position number 0 is the Rx_addr_match (Address Match Field). The PHY_PD field indicates whether PHY 126 is requested to go into a power down mode, and is also used to wake up PRY 126 once it has been powered down. The Lpbk field indicates whether PHY 126 is to perform a loopback for debugging, where in a loopback mode PHY 126 sends on RxD 134 the word received on TxD 136 without transmitting the word. The LED_SEL field indicates to PHY 126 a LED mode to use. The Rx_addr_match field indicates whether there is an address match for a frame received on data link 128.

A word based communication protocol between a MAC and a PHY, such as described above, facilitates in an interface in which the number of active pins making up the interface varies according to the type of PHY connected to the MAC. This allows a MAC to be designed with some fixed number of pins or contacts, but which may be connected to PHYs having varying pin or contact counts. The term port will also be used to indicate a pin or contact, or their equivalents.

Figure 9:
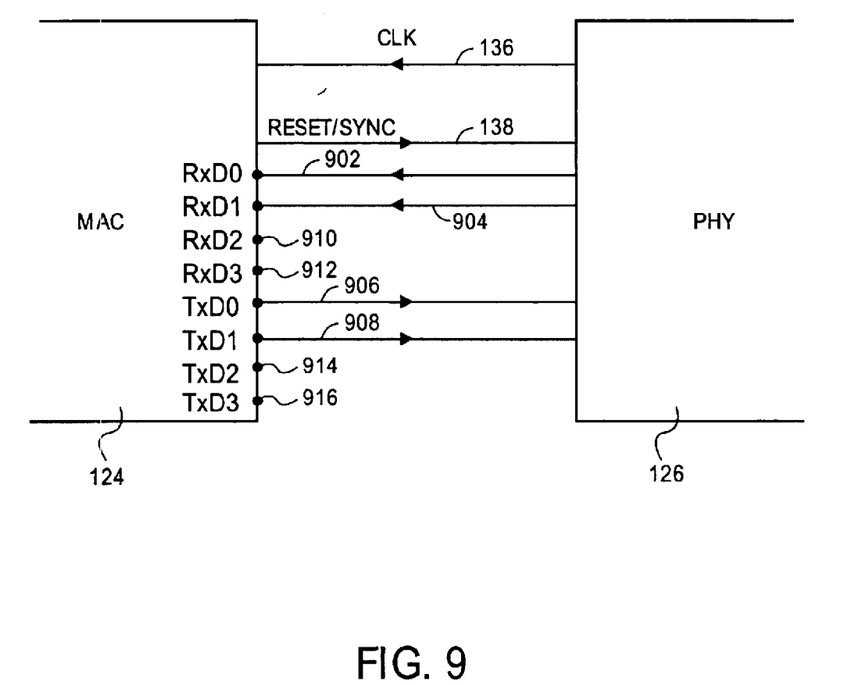
FIG. 9 is an exemplary embodiment of a MAC/PHY interface having two active receive and two active transmit ports.

For example, in FIG. 9 MAC 124 is connected to PHY 126 via CLK 138, Reset/Sync 139, RxD lines RxD0 902 and RxD1 904, and TxD lines TxD0 906 and TxD1 908. MAC 124 has the capacity for additional RxD and TxD lines, as indicated by ports RxD2 910, RxD3 912, TxD2 914, and TxD3 916, but these ports are not connected to PHY 126 because PHY 126 does not support these ports.

Figure 10:
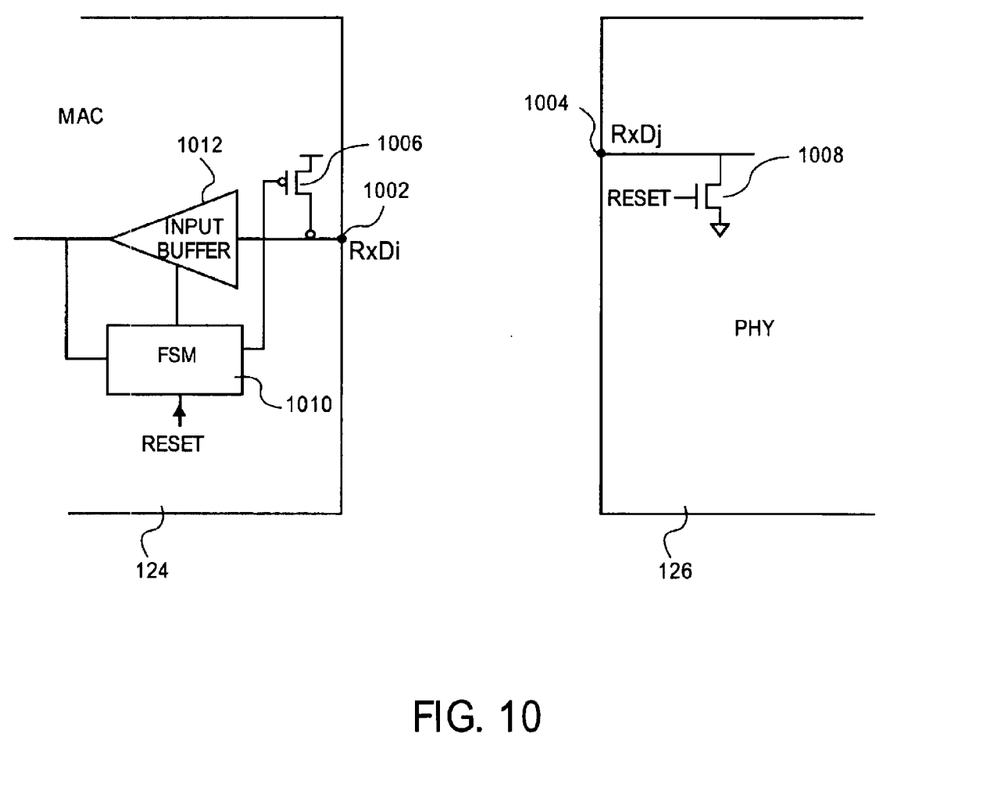
FIG. 10 is an exemplary embodiment of a circuit to determine the number of active ports in a MAC/PHY interface.

During a reset signal propagated on Reset/Sync 139, MAC 124 determines which RxD and TxD ports are connected to PHY 126. Because the number of active RxD ports are equal to the number of active TxD ports, MAC 124 needs only to determine the number of active RxD ports. An embodiment for determining active RxD ports is illustrated in FIG. 10. For simplicity, only one RxD pin or contact, RxDi 1002, is shown for MAC 124 and only one RxD pin or contact, RxDj 1004, is shown for PHY 126. MAC 124 has pullup pMOSFET (p-Metal Oxide Semiconductor Field Effect Transistor) 1006 and PHY 126 has pulldown nMOSFET 1008. Other pulldown and pullup circuits may be used in different embodiments. Pullup 100 and pulldown 1008 are designed so that pullup 1006 is weak compared to pulldown 1008. That is, if i=j so that RxDi and RxDj are connected together, then the pullup and pulldowns are sized such that RxDi is pulled down to ground (i.e., some common potential such as a substrate potential) if both pulldowns and pullups are ON.

Pulldown 1008 turns ON when Reset goes HIGH. Pullup 1006 is controlled by FSM (Finite State Machine) 1010 which is responsive to the Reset signal. When Reset goes HIGH, pullup 1006 is turned ON by FSM 1010 and the output of input buffer 1012 is sampled by FSM 1010 after some time interval. If the output of input buffer 1012 is sensed HIGH, then FSM 1010 determines that RxDi 1002 is not connected, in which case the output of input buffer 1012 is not strobed. If, however, the output of input buffer 1012 is sensed LOW, then FSM 1010 determines that RxDi 1002 is connected to PHY 126, in which case the output of input buffer 1012 is strobed every clock cycle to provide communication between MAC 124 and PHY 126.

Figure 11:
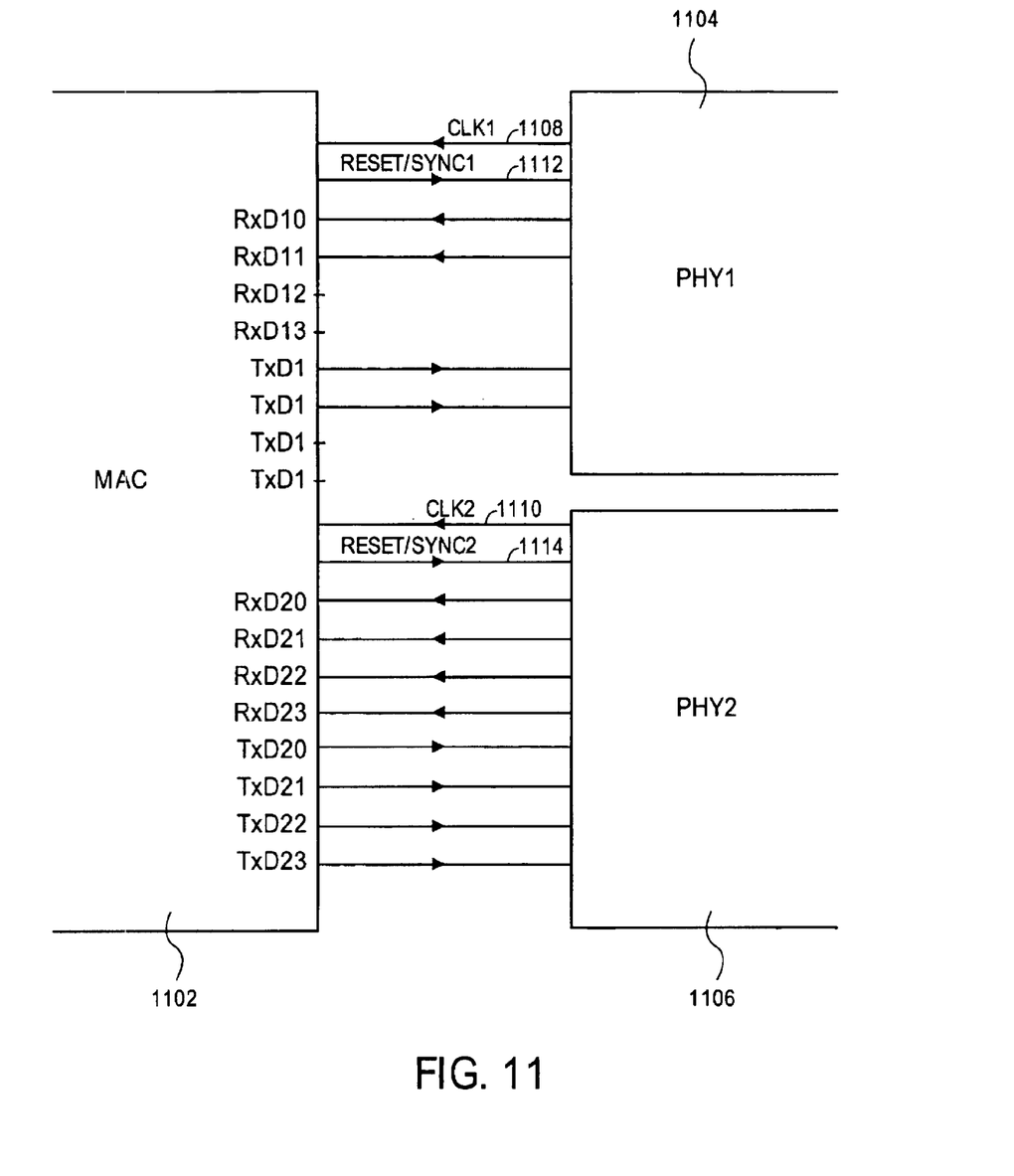
FIG. 11 is an exemplary embodiment of a circuit to determine the number of PHYs connected to a MAC.

Other embodiments provide for the determination of the active pins as well as the number of PHYs connected to MAC 124. An embodiment is illustrated in FIG. 11, where connected to MAC 1102 are PHY1 1104 and PHY2 1106. There are two clock signal lines, CLK1 1108 and CLK2 1110, and two Reset/Sync lines, Reset/Sync1 1112 and Reset/Sync2 1114. PHY1 1104 has connections for only two receive data lines and two transmit data lines, whereas PHY2 1106 has connections for four data receive lines and four data transmit lines.

Because each PHY provides its own clock signal, the number of PHYs connected to MAC 124 is determined by sensing the number of clock signal lines. Although not shown, pulldowns, finite state machines, input buffers, and pullups are provided in FIG. 11 as shown in FIG. 10. A clock signal is sensed by keeping Reset HIGH for some predetermined number of clock cycles, and sampling the output of the input buffers to determine if there is a clock signal. Determining the clock signal lines provides the number of connected PHYs, as well as the beginning of the receive data lines for each connected PHY. The number of active pins may be determined as described for FIG. 10.

For the embodiment shown in FIG. 1, Reset/Sync wire 139 provides a combination of a Reset signal and a Sync signal. The Reset signal clears registers (not shown) in PHY 126. The Sync signal for PHY 126 provides word synchronization. The Sync signal is synchronized with the clock signal of PHY 126 and has the same duty cycle. The Sync signal is introduced in addition to the clock signal so as to provide immunity to noise spikes on the clock signal, so that PtM and MtP words are assured of being properly aligned. The Reset is asserted asynchronously with the clock signal of PHY 126, but is de-asserted synchronously. The Reset signal is asserted for a longer interval of time than a clock cycle, e.g., the minimum assertion time is two clock cycles.

Figure 12A:
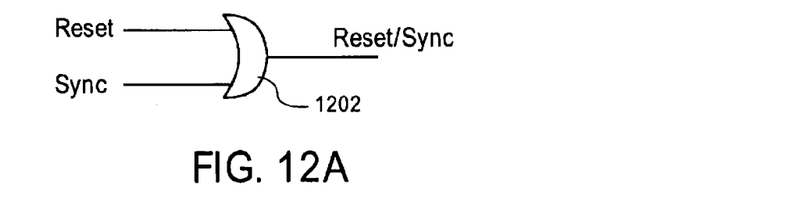
FIG. 12a is an exemplary embodiment of circuit for generating a Reset/Sync signal from a Reset signal and a Sync signal.

The Reset/Sync signal is generated from the Reset and Sync signals by providing the logical OR of the Reset and Sync signals, as shown in FIG. 12a using logic OR gate 1202. If the Reset signal is LOW, then the Reset/Sync signal is the same as the Sync signal, whereas when the Reset signal is HIGH, then the Reset/Sync signal is the same as the Reset signal because the Reset signal is longer in duration than the period of the Sync signal.

Figure 12B:
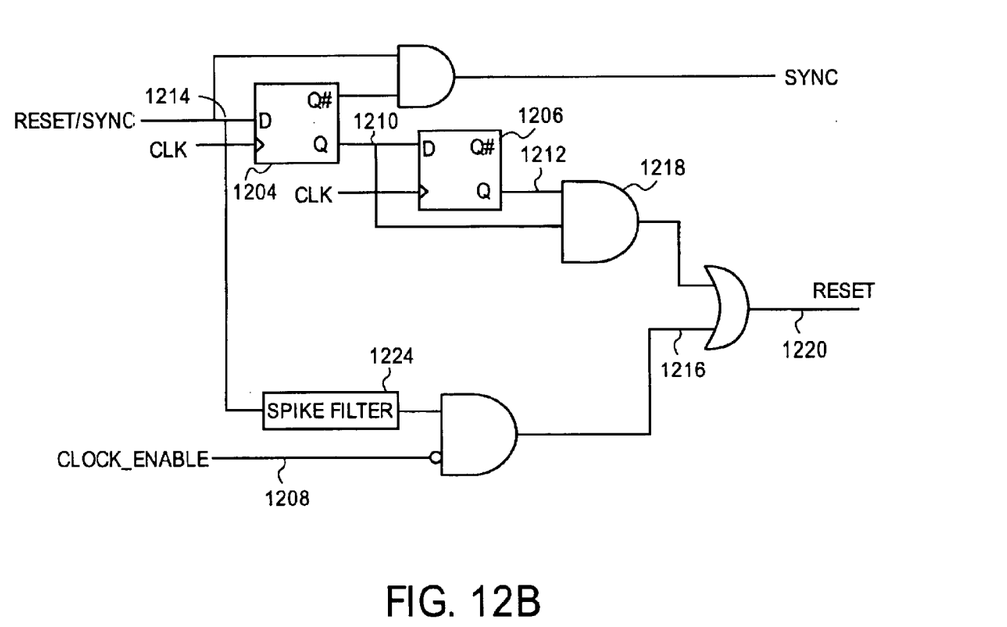
FIG. 12b is an exemplary embodiment of a circuit for separating the Reset and Sync signals from the Reset/Sync signal.

FIG. 12b provides an embodiment for decoding, or separating, the Reset and Sync signals from the Reset/Sync signal. D flip-flops 1204 and 1206 are clocked by the CLK (clock) signal provided by PHY 126, so that when the CLK signal is present, the signals at nodes 1210 and 1212 are, respectively, one unit and two unit delayed samples of the Reset/Sync signal at node 1214, where one unit is equal to one period of the CLK signal. PHY 126 provides the CLK signal when it is powered ON, whereas the CLK signal is not present when PHY 126 is in a power-down mode. During a power-down mode, the Clock_Enable signal at node 1208 is LOW. The case in which PHY 126 is powered ON is considered first.

With PHY 126 powered ON, the Clock_Enable signal is HIGH, so that node is 1216 is LOW. The inputs to AND gate 1218 are the current, first, and second unit delayed samples of the Reset/Sync signal at node 1214. The particular embodiment disclosed in FIG. 12b applies to the case in which a Reset signal is HIGH for at least three CLK cycles. D flip-flops 1204 and 1206 are edge-triggered flip-flops so that the Reset signal at node 1220 will be HIGH only if the Reset/Sync signal at node 1214 is held HIGH for at least three CLK cycles, thus indicating that PHY 126 is to be reset.

With PHY 126 in a power-down mode, Clock_Enable is LOW and D flip-flops 1204 and 1206 are not clocked. Spike filter 1224 filters out noise spikes so as to prevent false resets. When the Reset/Sync signal at node 1214 is held HIGH, node 1216 is brought HIGH so that PHY 126 is reset.

Many other embodiments may be utilized to separate the Sync and Reset signals from the Reset/Sync signals. These embodiments make use of the characteristic that the Reset signal is HIGH for at least n CLK cycles, where n≧2, so that PHY 126 is reset when the Reset/Sync signal is HIGH for n CLK cycles. Other tapped-delay lines may be employed to observe when the Reset/Sync signal is HIGH for n CLK cycles, or a finite state machine may be employed.

In some cases PHY 126 may not be connected to MAC 124, or if MAC 124 is capable of having more than one PHY connected, then there may not be the maximum number of PHYs connected. A PHY may be detected as in previously described embodiments that determine the number of active pins or ports. For example, for the case in which MAC 124 may be connected to one PHY, the RxD[0] pin, the first receive data pin, may be sampled as shown in FIG. 10 to determine if it is brought HIGH or LOW during reset. If it is HIGH, then no PHY is connected, whereas if it is LOW, then a PHY is connected.

Referring back to the computer system of FIG. 1, CPU 102 is under control of the operating system (OS), and the OS must load the correct driver software for the specific PHY connected to MAC 124. This is facilitated by storing in EEPROM 120 information related to various PHYs that may be connected to MAC 124. An internal register 140 in PHY provides an indirect pointer to a data structure (or structures) in EEPROM 120 providing the necessary information needed to load the proper driver for PHY 126. Chipset 130 may load the data structure into an internal register which is read by the OS so that the proper driver is loaded. The loading of the necessary data structure is independent of loading BIOS stored in memory 112.

After MAC 124 sends a Reset signal to PHY 126, MAC 124 and PHY 126 each exchange an identification word. For one embodiment, the identification word for PHY 126 is exchanged over one RxD pin, e.g., the Rx_D[0] pin, and the identification word for MAC 124 is exchanged over one Tx_pin, e.g., the Tx_D[0] pin. Each identification word includes a one-bit wide field, PDE (Power-Down Enable), to indicate whether a power-down mode is supported. If both of the MAC identification and PHY identification words have the PDE field set, then the power down mode is supported.

A power-down request is activated by MAC 124. As described earlier, the MtP word in FIG. 6 for Tx_EN=0 has the PHY_PD field in bit position 3. A power-down request is indicated when PHY_PD is set for two consecutive MtP words with Tx_EN=0. When the power-down mode is requested, PHY 126 may be in the process of sending data frames on data link 128. In such cases, if the power-down mode is requested by MAC 124, then PHY 124 may respond immediately and stop transmission of a data frame currently in progress: Or, PHY 126 may complete transmission of the current data frame before powering down. During power-down, the frequency of the CLK signal is reduced to save power. Also, during power-down PHY 126 may provide link information to MAC 124 so that MAC 124 may determine whether to bring PHY 126 out of power-down. To request PHY 126 to power-up, MAC 124 sets the field PHY_PD opposite to the value indicating a power-down request.

I claim:

1. A MAC (Media Access Control) to provide MAC-to-PHY words to a PHY (Physical Layer), wherein the MAC-to-PHY words are synchronized with a Sync signal generated internally by the MAC and wherein the PHY is resettable with a Reset signal generated internally by the MAC, the MAC comprising:
   a logic gate responsive to the Sync signal and the Reset signal to provide to the PHY a Reset/Sync signal indicative of the logical OR of the Sync and Reset signals.

2. The MAC as set forth in claim 1, the Sync signal having a period T, wherein the Reset signal when asserted has a time duration of at least 2T.

3. The MAC as set forth in claim 2, further comprising a port to receive a clock signal, wherein the Sync signal is synchronized to the clock signal.

4. The MAC as set forth in claim 1, further comprising a port to receive a clock signal, wherein the Sync signal is synchronized to the clock signal.

5. A PHY (Physical Layer) to receive MAC-to-PHY words from a MAC (Media Access Control) and to provide MAC-to-PHY words to the MAC, the PHY comprising:
   a set of registers; and
   a port to receive a Reset/Sync signal, where the Reset/Sync signal is indicative of the logical OR of a MAC generated Sync signal and a MAC generated Reset signal, wherein the MAC-to-PHY and PHY-to-MAC words are pair synchronized to the MAC generated Sync signal, and wherein the Reset signal clears the set of registers in the PHY.

6. The PHY as set forth in claim 5, wherein the MAC generated Sync signal has a period T and wherein the MAC generated Reset signal when asserted has a time duration of at least 2T.

7. The PHY as set forth in claim 5, further comprising:
a circuit to provide a Sync signal derived from the Reset/Sync signal synchronized with the MAC generated Sync signal and to provide a Reset signal derived from the Reset/Sync signal, where the PHY is reset in response to the Reset signal.

8. The PHY as set forth in claim 7, wherein the MAC generated Sync signal has a period T and wherein the MAC generated Reset signal when asserted has a time duration of at least 2T.

9. The PHY as set forth in claim 5, further comprising:
at least two delay elements, clocked by a clock signal, to provide two delayed samples of the Reset/Sync signal; and
at least one logic gate, when the clock signal is present, to assert a Reset signal if a current sample of the Reset/Sync signal and the two delayed samples of the Reset/Sync signal are each of a first logic state, wherein the Reset signal is not asserted if the current sample and two delayed samples of the Reset/Sync signal are each in a second logic state complementary to the first logic state.

10. The PHY as set forth in claim 9, further comprising a port to receive a Clock_Enable signal, wherein the Clock_Enable signal is indicative of the absence of the clock signal, wherein the PHY provides a Reset signal if the Clock_Enable signal indicates the absence of the clock signal and the MAC generates the Reset signal.

11. A computer system comprising:
a MAC (Media Access Control); and
a PHY (Physical Layer) to receive MAC-to-PHY words from the MAC and to provide PHY-to-MAC words to the MAC, the PHY including a port to receive a Reset/Sync signal, where the Reset/Sync signal is indicative of the logical OR of a MAC generated Sync signal and a MAC generated Reset signal, wherein the MAC-to-PHY and PHY-to-MAC words are pair synchronized to the MAC generated Sync signal, and the PHY comprising a set of registers, wherein the Reset signal clears the set of registers.

12. The computer system as set forth in claim 11, wherein the MAC generated Sync signal has a period T and wherein the MAC generated Reset signal when asserted has a time duration of at least 2T.

13. The computer system as set forth in claim 11, further comprising:
a circuit to provide a Sync signal derived from the Reset/Sync signal synchronized with the MAC generated Sync signal and to provide a Reset signal derived from the Reset/Sync signal, where the PHY is reset in response to the Reset signal.

14. The computer system as set forth in claim 13, wherein the MAC generated Sync signal has a period T and wherein the MAC generated Reset signal when asserted has a time duration of at least 2T.

15. The computer system as set forth in claim 11, further comprising:
at least two delay elements, clocked by a clock signal, to provide two delayed samples of the Reset/Sync signal; and
at least one logic gate, when the clock signal is present, to assert a Reset signal if a current sample of the Reset/Sync signal and the two delayed samples of the Reset/Sync signal are each of a first logic state, wherein the Reset signal is not asserted if the current sample and two delayed samples of the Reset/Sync signal are each in a second logic state complementary to the first logic state.

16. The computer system as set forth in claim 15, further comprising a port to receive a Clock_Enable signal, wherein the Clock_Enable signal is indicative of the absence of the clock signal, wherein the PHY provides a Reset signal if the Clock_Enable signal indicates the absence of the clock signal and the MAC generates the Reset/Sync signal.

* * * * *

UNITED STATES PATENT AND TRADEMARK OFFICE
CERTIFICATE OF CORRECTION

PATENT NO.    : 6,782,001 B1
DATED         : August 24, 2004
INVENTOR(S)   : Bachrach It is certified that error appears in the above-identified patent and that said Letters Patent is hereby corrected as shown below:

Column 2,
Line 60, delete "MAC-to-PRY" and insert -- MAC-to-PHY --.

Column 3,
Line 64, delete "1data" and insert -- data --.

Column 5,
Line 54, delete "PRY" and insert -- PHY --.

Column 8,
Line 18, delete "TX_pin" and insert -- Tx_D pin --.
Line 34, delete "progress:" and insert -- progress. --.

Signed and Sealed this

Thirtieth Day of November, 2004

JON W. DUDAS
*Director of the United States Patent and Trademark Office*